June 13, 1961 R. H. BERTRAM 2,988,370
TOY VEHICLE
Filed Sept. 8, 1958
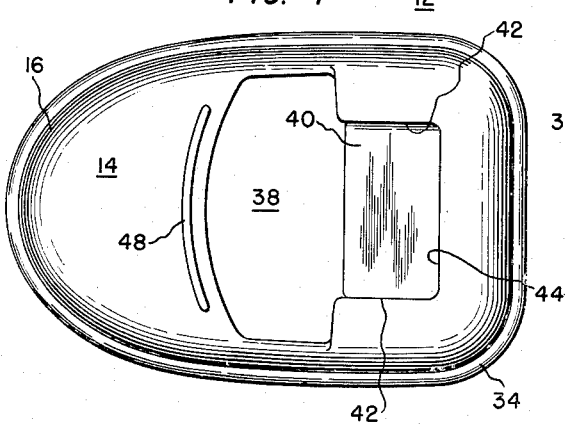
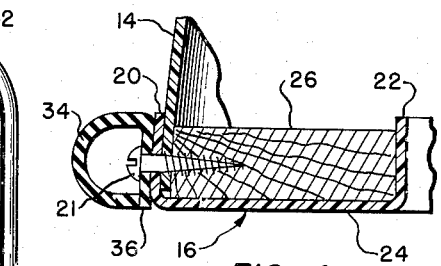
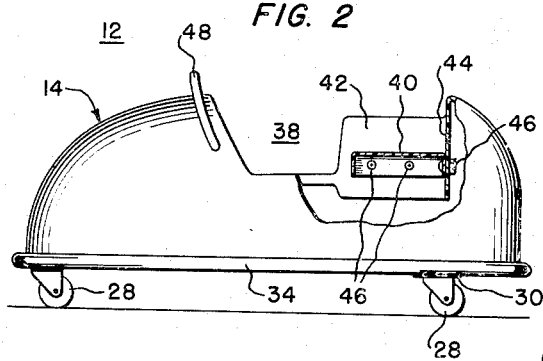
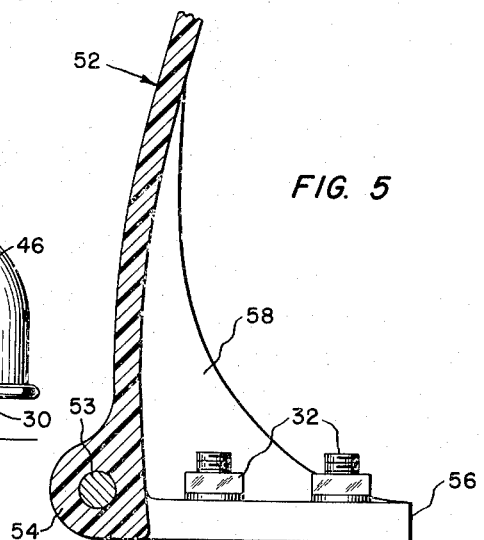
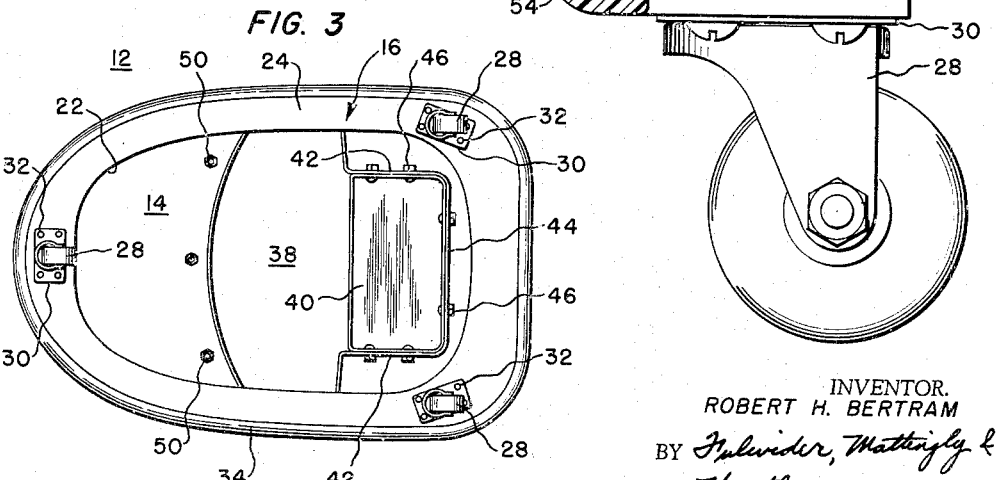
INVENTOR.
ROBERT H. BERTRAM
BY *Fulwider, Mattingly & Huntley*
ATTORNEYS

United States Patent Office 2,988,370
Patented June 13, 1961

2,988,370
TOY VEHICLE
Robert H. Bertram, 7833 Longdale Drive,
Lemon Grove, Calif.
Filed Sept. 8, 1958, Ser. No. 759,550
3 Claims. (Cl. 280—87.02)

The present invention relates to a toy vehicle and more particularly to a toy vehicle which includes a base portion having a comparatively large opening provided therein to permit freedom of movement of the operator of the vehicle.

According to the present invention, means are provided which form a hollow enclosure having a base portion. This base portion may be made an integral part of the enclosure, as will be seen, or it may be made separately and affixed thereto by any suitable means, such as by screws, nuts and bolts, or any similar fastening means. The enclosure includes an opening in the top which serves as a cockpit, providing ingress and egress for a child. Seat means are mounted to the enclosure to permit the child to conveniently operate the vehicle in a seated position. Operation of the vehicle by the child is through movement of the feet and legs upon the surface over which the vehicle is to be operated. For this purpose the base portion of the enclosure is almost completely cut away. This provides the child with almost complete freedom of movement, and there is no danger of the child scraping or bruising his feet or legs on the enclosure or any associated structure while operating the vehicle. In effect, the base portion forms an annulus which is unbroken by any intervening structure, and through which the child's feet may project to touch the surface supporting the vehicle.

It is an important feature of the present invention that the opening in the annular base portion allows unrestricted movement of the child's feet and legs, and that no projection or protuberance is interposed to obstruct or bruise the child in operating the vehicle.

Roller or wheel means are mounted to the base portion of the vehicle to support it in spaced relationship above the surface over which the vehicle is to be operated. The wheel means are preferably of the caster type to permit the vehicle to be propelled in any horizontal direction, and are also preferably mounted to the base portion in a position recessed inside the outer edge of the base portion. With the wheels thus recessed, the outer edge of the base portion serves as a bumper. For this purpose it is provided with a resilient attachment to protect the vehicle, and also furniture when the vehicle is used indoors.

It is also noted that by reason of the mounting of the wheels inside the outer periphery of the base portion of the vehicle, inadvertent tipping of the vehicle is limited. That is, if the vehicle is tipped about one of the wheels, the tipping is stopped by the contact occuring between the base portion of the vehicle and the surface upon which the vehicle is disposed. Further, during the time of such contact between such surface and the base portion, the center of gravity of the vehicle is located considerably inside the wheels so that an automatic righting moment exists.

It is another feature of the invention that the means forming the hollow enclosure of the vehicle are also load-bearing, and are not of built-up construction. Thus, no cross braces and strengthening panels are required. The fore and after part of the enclosure is therefore strong enough, if need be, to support the weight of a child standing or sitting on the outer surface of the enclosure. The unitary construction also affords a light-weight enclosure which is simple and relatively inexpensive to fabricate. This type of construction lends itself particularly well to fabrication of the vehicle using plastic materials or glass fiber resin laminates. Such materials and laminates are attractive, sleek in appearance, and highly resistant to damage even under hard usage.

Other objects and features of the present invention will be readily apparent to those skilled in the art from the following specification and appended drawings wherein is illustrated a preferred form of the invention, and in which, FIGURE 1 is a plan view of the toy vehicle of the present invention;

FIGURE 2 is a side elevational view of the vehicle, a portion thereof being cut away to illustrate details of the seat mounting;

FIGURE 3 is a view of the underside of the vehicle;

FIGURE 4 is a detail view, on an enlarged scale, of the manner of attachment of the bumper to the vehicle base portion; and FIGURE 5 is a detail view of an alternative form of construction for the base portion of the vehicle, illustrating also the manner of attachment of a typical wheel thereto.

Referring to FIGURES 1 through 4 of the drawings, there is illustrated an embodiment of the toy vehicle of the present invention which is generally designated 12, and which is particularly adapted for use by children. As will be seen, vehicle 12 is easy to maneuver both inside and outside of the home, and may be used for the recreation of comparatively older children as well as for teaching younger children to walk. For the most part, vehicle 12 is made of light weight material such as, for example, molded plastic material, or glass fiber-resin laminating material. This type of construction affords easy portability and provides a vehicle which is capable of withstanding hard usage. As will be seen, the construction of vehicle 12 is also such that a child may operate it with almost complete safety; it is difficult to overturn and the manner of accommodation of the child therewithin renders it unlikely that the child will fall out or injure himself.

Toy vehicle 12 comprises, generally, a hollow enclosure 14 which is preferably shaped into a substantially streamlined configuration for aesthetic purposes, and which is preferably molded of plastic materials or of glass fiber-resin laminating materials for durability and light weight. It will be apparent, however, that enclosure 14 may also be formed of other materials if desired.

The skin or walls of enclosure 14 are upwardly convex, as illustrated, and are contoured downwardly at the sides, front, and back to mate with a peripherally disposed base portion or channel 16. Channel 16 includes an upstanding outer flange 20 and an upstanding inner flange 22 which are connected together by a flat, horizontally disposed yoke portion 24.

The lower edge of the downwardly contoured walls of enclosure 14 is secured to flange 20 by a plurality of suitable fasteners such as nut and bolt assemblies 21 or the like. If desired, a reinforcing section 26 of rigid material such as wood may be disposed between flanges 20 and 22 adjacent portion 24 to strengthen enclosure 14 against bending and distortion and provide a place of attachment for wheels 28 and the bumper strip, as will be seen. Section 26 may be secured in position by any suitable means, such as by adhesives or the like, and arranged about the entire periphery of base portion 16. For lightness the disposition of section 26 about the complete periphery of portion 16 may be dispensed with if the wall thickness of enclosure 14 is made substantial enough. In that case, short lengths of section 26 located within channel 16 above each of the plurality of wheels 28 would be all that would be necessary, or sections 26 could be eliminated altogether if the wall thickness of portion 16 were sufficient to mount the bumper strip and wheels 28.

Each wheel 28 is preferably of the casterable type, being rotatably supported by side elements which are carried by a horizontal mounting plate 30. Plate 30, in turn, is secured to channel 16 and section 26 by usual nuts and bolts 32. As will be apparent, the employment of casterable wheels 28 permits vehicle 12 to be moved in any horizontal direction. The diameter of wheels 28 is made large enough to permit vehicle 12 to be easily rolled over irregularities in sidewalks, patios, pavements and the like.

With this construction a streamlined enclosure 14 is provided which is strengthened against bending and buckling by reason of the unitary or single piece design thereof, and also by reason of the provision of channel 16. That is, flanges 20 and 22 of channel 16 serve to bear the main effect of vertical loads imposed upon channel 16, and yoke portion 24 and section 26 serve to strengthen enclosure 14 against lateral distortion, particularly such as might be encountered when the vehicle strikes obstructions.

A hollow bumper 34 made of resilient material such as rubber is adhered or mechanically fastened by an inner flange 36 thereof to flange 20 of base portion 16. Bumper 34 is disposed about the complete periphery of flange 20 to thereby afford protection for vehicle 12 upon collision thereof with an obstruction.

Enclosure 14 is formed to provide an opening 38 in the upper part thereof, opening 38 serving as a cockpit within which a seat 40 may be mounted. Seat 40 is a flat horizontally disposed section having depending flanges about its periphery which are secured to a pair of side walls 42 and a rear wall 44 of enclosure 14 by a plurality of suitable fasteners 46. Walls 42 and 44 form downwardly directed extensions of the rear and side edge margins of opening 38 whereby walls 42 and 44 are vertically disposed and provide an attractive cockpit which is free of sharp edges and corners and which is easily entered by children.

A handle 48 is mounted at the forward part of the cockpit, and serves as a convenient means for a child to support himself when he uses vehicle 12. Handle 48 may be secured in position by any suitable fasteners 50 disposed through the upper curved wall of enclosure 14.

An alternative form of construction for the base portion of enclosure 14 is illustrated in FIGURE 5. In this embodiment, which is designated 52, the complete enclosure is made of welded plastic, and the lower edge or rim of the walls forming enclosure 14 is molded or formed as an integral peripheral base section 54 of enclosure 52. Base section 54 may be molded about a metal rod or tube 53 to provide extra strength for base section 54. That is, rod 53 serves to strengthen section 54 against buckling or bending.

A web or gusset 58 of metal or plastic is integrally molded with enclosure 14, or is rigidly secured thereto subsequently, to provide a means for fastening wheels 28 to base section 54. Gusset 58 includes a horizontal portion 56 to which plate 30 of wheel 28 may be secured.

With this construction, a separate base portion 16 is eliminated, base section 54 serves as a bumper, eliminating bumper 34, and rod 53 provides the type of reinforcement that was provided by base portion 16 in the embodiment of FIGURE 1. In all other respects the construction of enclosure 14 of both embodiments is substantially identical.

Thus, as particularly illustrated in FIGURE 3, a vehicle 12 has been provided which is so constructed that no impediment or obstacle is interposed between the cockpit of vehicle 12 and base portion 16 thereof, or at any point within the annulus of portion 16. The unbroken or impervious design of enclosure 14 substantially eliminates the need for any additional struts or bracing which might interfere with the operation of vehicle 12 by a child.

Vehicle 12 is also seen to be quite resistant to tipping or overturning. For example, if the vehicle tipped, it would tip along the axis of an imaginary line drawn between the front wheel and one of the side walls. This being the case, a good portion of base 16 will be outside this line and will strike the ground, limiting the tipping movement long prior to any overturning of vehicle 12.

While the form of embodiment herein shown and described constitutes a preferred form, it is to be understood that other forms may be adopted falling within the scope of the claims that follow.

I claim:

1. A toy vehicle comprising a self-supporting, unitized, body member having wall means contoured upwardly and inwardly to form an upwardly convex, hollow, and continuous enclosure having an upper opening and a lower opening, the portion of said wall means defining the forward side portions of said upper opening being of a height less than that of the portions of the wall means defining the front portion, the rearward side portions, and the rear portion of said upper opening, the lateral width between the portions of the wall means defining the rearward side portions of said upper opening being less than that of the portions of the wall means defining the forward side portions of said opening, seat means disposed adjacent the rearward portion of the said upper opening, said seat means including integral depending walls forming a continuation of said portion of said wall means defining the rearward side portions of said upper opening and a seat section connected to said depending walls adjacent the lower edges thereof and wheel means mounted to the bottom of said hollow enclosure, each of said wheel means being casterable whereby a child can manipulate the toy vehicle in any direction.

2. A toy vehicle comprising a self-supporting, unitized, body member having wall means contoured upwardly and inwardly to form an upwardly convex, hollow, and continuous enclosure having an upper opening and a lower opening, the portion of said wall means defining the forward side portions of said upper opening being of a height less than that of the portions of the wall means defining the front portion, the rearward side portions, and the rear portion of said upper opening, the lateral width between the portions of the wall means defining the rearward side portions of said upper opening being less than that of the portions of the wall means defining the forward side portions of said opening, said wall means forming said lower opening extending inwardly and upwardly to form a peripheral channel of a width sufficient to support the feet of a child, seat means disposed adjacent the rearward portion of the said upper opening, said seat means including integral depending walls forming a continuation of said portion of said wall means defining the rearward side portions of said upper opening and a seat section connected to said depending walls adjacent the lower edges thereof and wheel means mounted to the bottom of said hollow enclosure, each of said wheel means being casterable whereby a child can manipulate the toy vehicle in any direction.

3. A toy vehicle in accordance with claim 2 wherein said wall means are molded, and a metal reinforcing member is molded within said wall means adjacent and coextensive with the lower perimetral portions of said wall means defining the margins of said lower opening.

References Cited in the file of this patent
UNITED STATES PATENTS

| 261,919 | Gibbons | Aug. 1, 1882 |
| 2,034,824 | Nelson | Mar. 24, 1936 |
| 2,425,253 | Little | Aug. 5, 1947 |

FOREIGN PATENTS

| 166,730 | Switzerland | Apr. 2, 1934 |